United States Patent
Yonemura et al.

(10) Patent No.: US 6,895,681 B2
(45) Date of Patent: May 24, 2005

(54) METHOD AND INSTRUMENT FOR MEASURING INSIDE DIAMETER OF CONDUIT

(75) Inventors: Yasushi Yonemura, Tokyo (JP); Kiichi Suyama, Tokyo (JP); Ryuji Sakasai, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 0 days.

(21) Appl. No.: 10/473,717
(22) PCT Filed: Mar. 28, 2002
(86) PCT No.: PCT/JP02/03041

§ 371 (c)(1),
(2), (4) Date: Oct. 1, 2003

(87) PCT Pub. No.: WO02/082006
PCT Pub. Date: Oct. 17, 2002

(65) Prior Publication Data
US 2004/0111910 A1 Jun. 17, 2004

(30) Foreign Application Priority Data
Apr. 2, 2001 (JP) .................................... 2001-103489

(51) Int. Cl.[7] ................................................ G01B 5/20
(52) U.S. Cl. ................................. 33/544; 33/DIG. 13
(58) Field of Search .......................... 33/544, DIG. 13, 33/542, 543, 555.1

(56) References Cited

U.S. PATENT DOCUMENTS

| | | | | |
|---|---|---|---|---|
| 3,755,908 A | * | 9/1973 | VerNooy | 33/544.3 |
| 4,342,225 A | * | 8/1982 | Jandera et al. | 33/544.3 |
| 4,443,948 A | | 4/1984 | Reeves | |
| 4,457,073 A | * | 7/1984 | Payne | 33/544.3 |
| 4,747,317 A | * | 5/1988 | Lara | 33/544 |
| 4,930,223 A | | 6/1990 | Smith | |
| 4,953,412 A | * | 9/1990 | Rosenberg et al. | 33/544 |
| 6,065,218 A | * | 5/2000 | Edwards | 33/544 |

FOREIGN PATENT DOCUMENTS

| | | |
|---|---|---|
| JP | 62-083608 | 4/1987 |
| JP | 64-054216 | 3/1989 |

* cited by examiner

*Primary Examiner*—Christopher W. Fulton
(74) *Attorney, Agent, or Firm*—McGinn & Gibb, PLLC (57) ABSTRACT

An apparatus for measuring an inner diameter of a pipeline is incorporated into a passage pig for checking passableness through the pipeline or a cleaning pig for cleaning within the pipeline, the passage pig and the cleaning pig including at least one seal cup sealably sliding along an interior surface of the pipeline. The apparatus includes a travel distance measuring unit for measuring a travel distance of the passage pig or the cleaning pig within the pipeline, a swing angle detector for detecting a swing angle of a pig body during the travel distance measurement, a displacement detector for individually detecting a radial displacement of the peripheral portion of the seal cup at a number of points along an entire circumference during the travel distance measurement, a computing unit for computing an output from each of said means, and a recording means for recording an output from the computing unit.

6 Claims, 10 Drawing Sheets

METHOD AND INSTRUMENT FOR MEASURING INSIDE DIAMETER OF CONDUIT

TECHNICAL FIELD

The present invention relates to a method for measuring the inner diameter of a pipeline and an apparatus therefor, which employ an inner diameter caliper pig running within a pipeline to measure the inner diameter of the pipeline and detect protruded and recessed portions on the inner circumferential surface of the pipeline, deformations of the pipeline, and the like.

BACKGROUND ART

Some inner diameter caliper pigs are allowed to run within a pipeline to measure the inner diameter of the pipeline or to detect protruded and recessed portions on the inner circumferential surface of the pipeline and deformations of the pipeline and the like. A seal cup of such an inner diameter caliper pig is formed of a resilient material and has a property of being dented about 10% of the diameter. There is known a mechanical apparatus which measures the deformation of such a seal cup to detect a deformation of the pipeline interior. For example, there is available a mechanical apparatus with a skeletal structure which is formed in the shape of a "Karakasa," a Japanese paper umbrella, capable of being opened or closed, within the inner surface of the seal cup.

Figure 11:
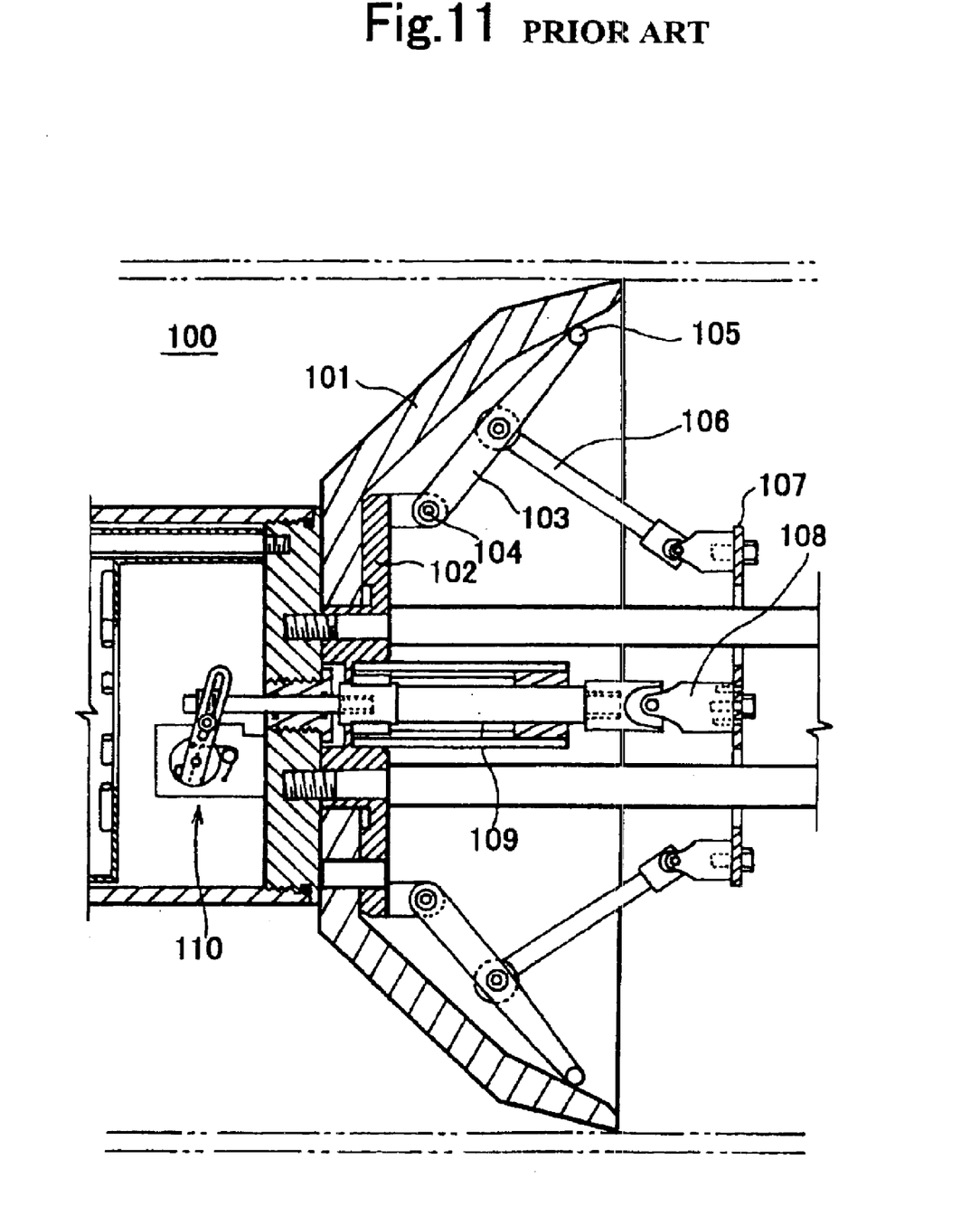
FIG. 11 is an explanatory view illustrating a mechanical measuring device of a prior art inner diameter caliper pig.

Disclosed in U.S. Pat. No. 4,953,412 is a technique for measuring a deformation of a seal cup with a mechanical measuring device. FIG. 11 illustrates such a mechanical measuring device of a prior art inner diameter caliper pig. This device is provided with levers 103 for detecting a displacement near the edge of a seal cup 101 of a pig 100 running within a pipeline and adapted to convey their movements by means of link mechanisms 106. For example, there are twelve levers 103 arranged along the circumference. The lever 103 is pivotally attached at one end to a pig body frame 102 with a pin 104 and provided at the other end with a contact probe 105 which is in contact with the reverse surface of the seal cup 101 near the edge thereof to sense the movement of the edge of the seal cup. The link 106 is coupled to the central portion of the lever to sense the movement of the lever 103. The other end of the link 106 is coupled to a disc 107 near the outer circumference thereof. The disc 107 is movable with respect to a bracket 108 that is generally perpendicular to the pig axis and supports the disc at its center. The disc 107 is tilted about the bracket 108 in response to the movement of the link 106. The tilting movement of the disc 107 about the bracket 108 is detected by the axial movement of a plurality of points on the disc 107. As this mechanism, the figure shows only a coupling shaft 109 and a detection mechanism 110 for detecting the movement of the central portion, not illustrating the detection mechanisms at other points on the disc which, however, are similar to the one illustrated. The detection mechanism 110 for detecting the axial movement includes an electrical transducer, so that the extent of displacement is transformed into electrical signals for storage.

The device transforms the movement of the contact probe 105 (for sensing a variation in the interior wall of a pipeline, i.e., a deformation of the seal cup 101 near the edge thereof) into a tilting movement of the disc 107 for detection. Therefore, only information on an average tendency can be obtained. For example, it is not possible to determine whether a variation in the inner diameter of the pipeline is due to a weld bead or a partial dent. It is also impossible to determine the orientation of a dent in the pipeline. Furthermore, an elliptical deformation in the inner diameter of the pipeline could not be sensed in a specific manner.

The present invention is intended to provide a technique which can improve the prior art inner diameter caliper pig to measure with high accuracy a deformation of a seal cup running within a pipeline; which can distinguish a weld bead from other deformations so as to provide information as to the circumferential location of the deformation; and which can detect the inner diameter of a pipeline even when deformed into an elliptical shape or other shapes.

DISCLOSURE OF THE INVENTION

Certain aspects of the invention relate to a method for measuring the inner diameter of a pipeline.

The invention according a first aspect of the invention is characterized in that a radial or tangential strain of a seal cup of an inner diameter caliper pig running within a pipeline is detected to determine a deformation of a peripheral portion of the seal cup and thereby detect a variation in the inner diameter of the pipeline.

The method for measuring the inner diameter of a pipeline according to a second aspect of the invention is characterized in that a travel position of the seal cup within the pipeline is also determined.

The method for measuring the inner diameter of a pipeline according to a third aspect of the present invention is characterized in that a circumferential swing angle of the seal cup is determined at the same time to detect a cross-sectional position of deformation of the pipeline relative to the vertical.

The invention according to a fourth aspect of the present invention is characterized in that using a passage pig for checking for passableness through the pipeline or a cleaning pig for cleaning within the pipeline while running through the pipeline, the passage pig and the cleaning pig including at least one seal cup sealably sliding along an interior surface of the pipeline, while the passage pig or the cleaning pig is running within the pipeline, a travel distance and a swing angle thereof are detected and a radial displacement of a peripheral portion of the seal cup is detected individually at a number of points along an entire circumference thereof, and a position of deformation and an extent of deformation of the interior surface of the pipeline are determined in accordance with detection data of the travel distance, the swing angle, and the radial displacement.

The method for measuring the inner diameter of a pipeline according to a fifth aspect of the present invention is characterized in that the passage pig or the cleaning pig is allowed to pass through the pipeline before a pipeline interior inspection pig is passed therethrough.

The inventions according to the following aspects relate to an apparatus for measuring the inner diameter of a pipeline.

The invention according to a sixth aspect of the present invention is characterized by an apparatus for measuring the inner diameter of a pipeline, the apparatus including strain gauges disposed on a number of radii or concentric circles on an inner surface of a seal cup of an inner diameter caliper pig; a strain detector for detecting and recording a deformation of individual strain gauges; a travel distance recording device; a swing angle detector provided on a pig body; and a computing device for computing a variation in pipeline inner diameter from a measurement value provided by the measuring devices and a measurement value provided by the swing angle detector.

The apparatus for measuring the inner diameter of a pipeline according to a seventh aspect of the present invention is characterized in that the strain gauge is affixed to a root portion of a resilient material disposed radially with a distal end thereof being in contact with the inner surface of the seal cup.

The invention according to an eighth aspect of the present invention is an apparatus for measuring an inner diameter of a pipeline, the apparatus being incorporated into a passage pig for checking for passableness through the pipeline or a cleaning pig for cleaning within the pipeline while running through the pipeline, the passage pig and the cleaning pig including at least one seal cup sealably sliding along an interior surface of the pipeline, the apparatus including travel distance measuring means for measuring a travel distance of the passage pig or the cleaning pig within the pipeline; swing angle detector means for detecting a swing angle of a pig body during the travel distance measurement; displacement detector means for individually detecting a radial displacement of a peripheral portion of the seal cup at a number of points along an entire circumference during the travel distance measurement; computing means for computing an output from each of the means; and recording means for recording an output from the computing means, the apparatus characterized in that the computing means delivers a detected displacement from the displacement detector means corresponding to an output from the travel distance measuring means and an output from the swing angle detector means at a travel position thereof.

The present invention having such features provides a method for measuring the inner diameter of a pipeline, the method being characterized by detecting a radial or tangential strain of the seal cup of the inner diameter caliper pig running within a pipeline to determine a deformation of the peripheral portion of the seal cup and thereby detect a variation in the inner diameter of the pipeline. Preferably, in this case, strain gauges are disposed on a number of radii or concentric circles on the seal cup to detect strain at a number of points and thereby detect the cross-sectional shape of the peripheral portion of the seal cup in accordance with the data. In this case, it is possible to identify the location of dents and rises or deformations of the pipeline by determining the travel position of the seal cup within the pipeline. It is also preferable to simultaneously determine the circumferential swing angle of the seal cup to detect the cross-sectional position of deformation of the pipeline relative to the vertical.

The apparatus according to the present invention that preferably implements the aforementioned method according to the present invention is an apparatus for measuring the inner diameter of a pipeline, the apparatus being characterized by including strain gauges disposed on a number of radii or concentric circles on the inner surface of a seal cup of an inner diameter caliper pig; a strain detector for detecting and recording a deformation of individual strain gauges; a travel distance recording device; a swing angle detector provided on a pig body; and a computing device for computing a variation in pipeline inner diameter from a measurement value provided by the measuring devices and a measurement value provided by the swing angle detector. The strain gauges are disposed radially in the vicinity of a peripheral portion of the seal cup, for example, at angular intervals of 30 degrees with respect to the center, and affixed directly to the seal cup to detect a radial strain. Furthermore, the strain gauges may also be disposed concentrically at equal intervals in the vicinity of the peripheral portion of the seal cup to detect a tangential strain of the seal cup. The travel distance recording device ascertains the travel position of the seal cup within a pipeline, thereby enabling one to detect the position of a dent or the like. For example, provided as the travel distance recording device is an odometer that rolls in contact with the interior surface of a pipeline or a system that records the time at which data is recorded. Such a system that makes measurements at intervals of several millimeters traveled by the odometer would make it possible to know later the distances at which measurement data was recorded. The system for recording the time at which data was recorded makes it possible to provide general knowledge on positions. Now, the swing angle detector may be adapted to indicate the pig attitude relative to the vertical, for example, a device made up of a pendulum and an encoder for sensing its swing angle can be employed. The computing device can compute the deformation of the seal cup by processing measurement values of a number of strain gauges, compute the attitude of the pig from an output from the swing angle detector, and calculate a specific deformation in the inner diameter of the pipeline.

The apparatus according to the present invention may be configured as an apparatus for measuring the inner diameter of a pipeline in which the strain gauge is affixed to the root portion of a resilient material disposed radially with a distal end thereof being in contact with the inner surface of the seal cup. Since the inner diameter caliper pig runs through a pipeline installed in the field, the strain gauge directly affixed to the back surface of a seal cup of the pig would cause a serious contamination. Suppose that a resilient bar is radially disposed from a boss portion of the seal cup with the distal end portion thereof being in contact with the inner surface (back surface) of the seal cup and a strain gauge being disposed at the root of the resilient bar. Preferably, this allows the strain gauge to detect the deformation of the resilient bar in response to the displacement thereof, thereby making it possible to detect the deformation of the seal cup with high sensitivity. Preferably, this also facilitates maintenance and inspection because the strain gauge is affixed to the boss portion of the seal cup resulting in less contamination.

Describing more specifically the measuring method and the measuring apparatus according to the present invention, the facilities for the aforementioned inner diameter caliper pig are provided in a passage pig for being passed through a pipeline to check for passableness or a cleaning pig for being passed through a pipeline to clean the pipeline before a pipeline interior inspection pig is allowed to pass through the pipeline to evaluate the health within the pipeline and inspect the pipeline for corrosion and erosion. The facilities incorporated into a passage pig or a cleaning pig including at least one seal cup sealably sliding within the interior surface of a pipeline to run at a differential pressure include travel distance measuring means for measuring a travel distance of the pig within the pipeline; swing angle detector means for detecting the swing angle of a pig body during the measurement by means of the travel distance measuring means; and displacement detector means for using the aforementioned strain gauges to individually detect a radial displacement of a peripheral portion of the seal cup at a number of points along the entire circumference during the travel distance measurement, the outputs from which are computed by means of computing means. The computing means delivers an output of detected data on a radial displacement corresponding to an output from the travel distance measuring means and a detected output of swing angle of the pig body at a travel position thereof, the output delivered being recorded on recording means for subsequent analysis.

Such an output from the computing means makes it possible to analyze detected data obtained by the displacement detector means on the two-dimensional coordinates of the axial and circumferential directions of the pipeline, thereby enabling one to accurately detect the location of a deformation in the inner diameter of the pipeline. Additionally, it is also possible to accurately detect the extent of deformation by analyzing the magnitude of the output from the displacement detector means.

BEST MODE FOR CARRYING OUT THE INVENTION

Figure 1:
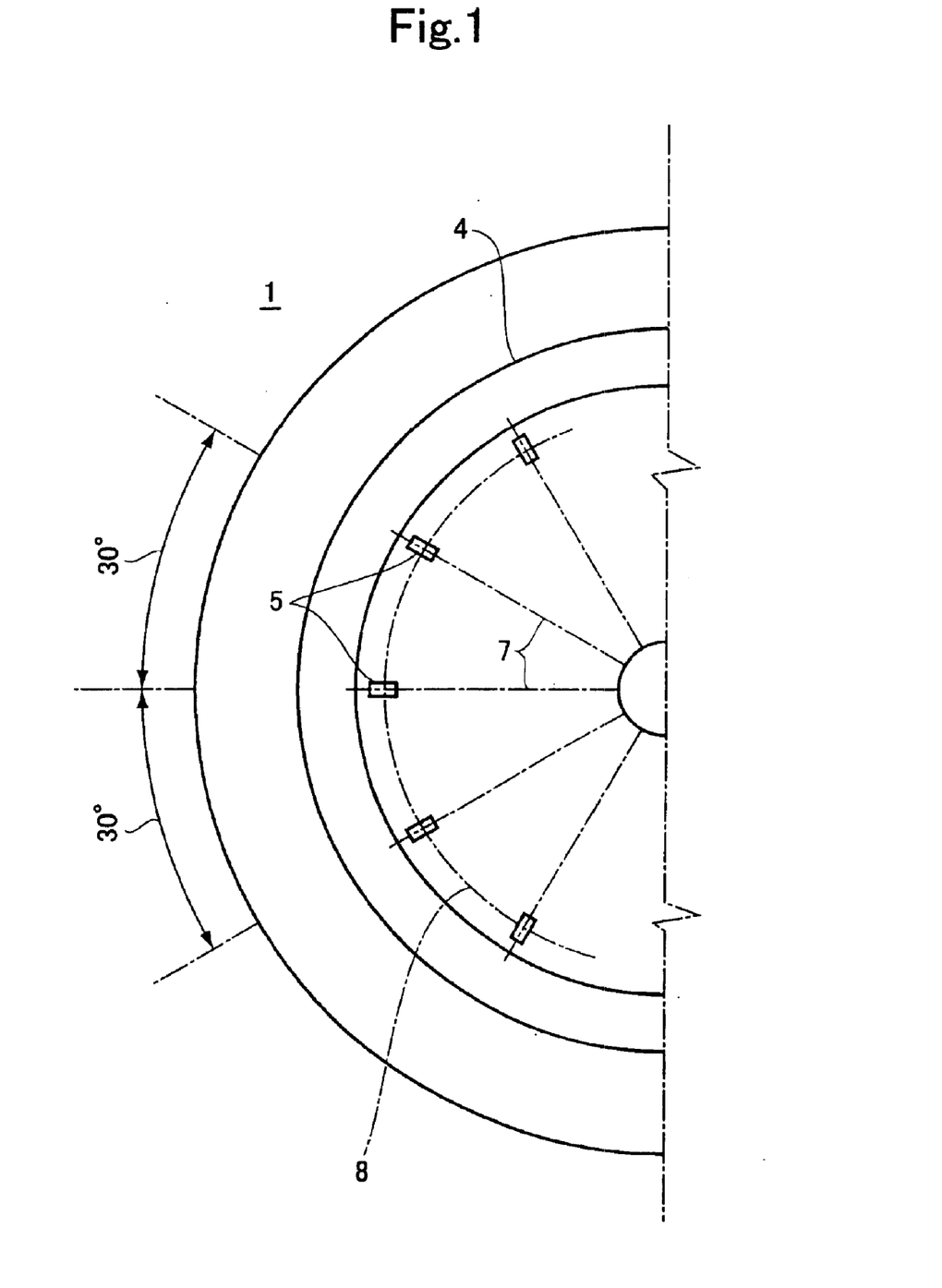
FIG. 1 is an explanatory view illustrating displacement detector means (a front view of a seal cup) of an inner diameter caliper pig related to a measuring apparatus according to the present invention.
Figure 2:
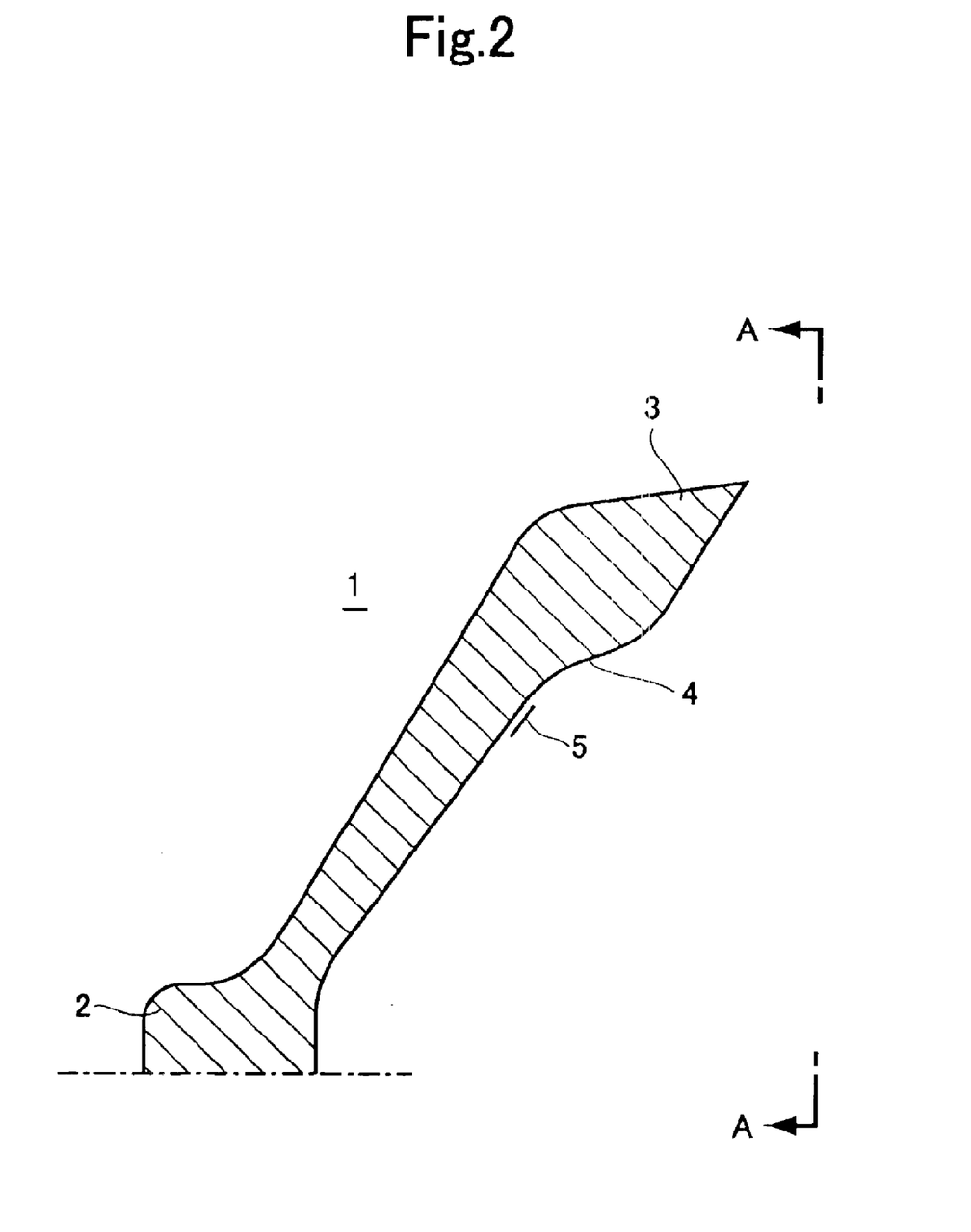
FIG. 2 is an explanatory view illustrating displacement detector means (a longitudinal sectional view of the seal cup) of the inner diameter caliper pig related to the measuring apparatus according to the present invention.

Now, the present invention will be described below with reference to the drawings in accordance with the embodiments. Referring to FIGS. 1 to 5, outlined is a displacement detector means incorporated into an inner diameter caliper pig for use with the measuring method or the measuring apparatus according to the present invention. FIGS. 1 and 2 are explanatory views illustrating a seal cup of the displacement detector means. FIG. 2 illustrates a portion above the center of a seal cup 1 in a longitudinal section. The seal cup 1 is formed in the shape of an umbrella from a boss 2 to a peripheral portion 3, and made of a resilient material such as urethane resin. There is affixed a strain gauge 5 to an inner surface 4 of the seal cup 1. FIG. 1 is a view taken along the line A—A of FIG. 2. Strain gauges 5 are affixed to a number of radii on the inner surface of the seal cup 1. In this example, five of the strain gauges 5 which are provided at angles of 30 degrees with respect to the center are illustrated with the other gauges being not shown. Each strain gauge 5 is provided with a strain detector for detecting and recording a deformation thereof. The strain gauges 5 are adapted to detect a radial strain, but may also be arranged concentrically to detect a tangential strain.

Figure 3:
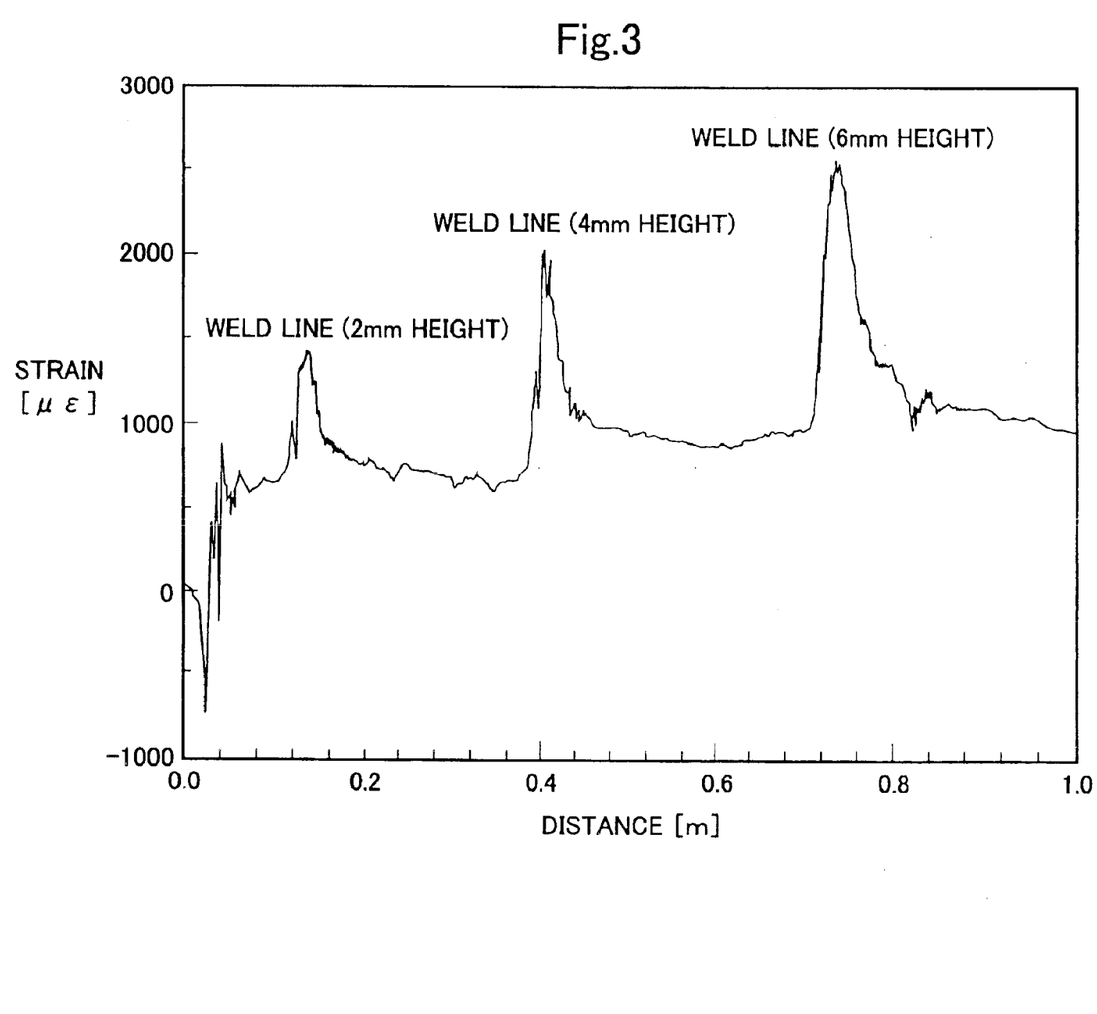
FIG. 3 is a graph showing an example of the output provided by the displacement detector means according to an embodiment of the present invention.

FIG. 3 shows an example of the relationship between the strain indicated by the strain gauge 5 and protruded portions within a pipeline. FIG. 3 is a graph showing the output recorded by the strain gauge 5 at weld lines when the seal cup shown in FIG. 1 has been passed through a steel pipe having an inner diameter of 600 mm and a length of 1 m in which formed are the weld lines protruding in heights of 2 mm, 4 mm, and 6 mm. The strain gauge 5 is affixed to the reverse surface of the seal cup 1 at a radius of 230 mm to detect a radial strain. FIG. 3 shows that the seal cup is deformed at the weld lines and the strain gauge indicates the extent of the deformations thereof, it being evident that the height of the weld lines and the strain are in a generally proportional relationship.

The relationship between the value obtained by the strain gauge and the deformation of the peripheral portion of the seal cup can be determined in advance according to the material properties and shape of the seal cup, the type and location of the strain gauge, the orientation of the strain measured, and other conditions. This correlation can be stored for all the strain gauges affixed to the seal cup to collect and compute the data from the strain gauges, thereby determining the extent of deformation at all the positions on the peripheral portion of the seal cup. It is therefore possible to quantitatively make measurements across the circumference of a pipeline as to the presence and size of dents and rises within the pipeline, the distinction of circumferential welding from other dents and rises, the location of a longitudinal seam welding, a buckling of the pipeline and the like.

Figure 4:
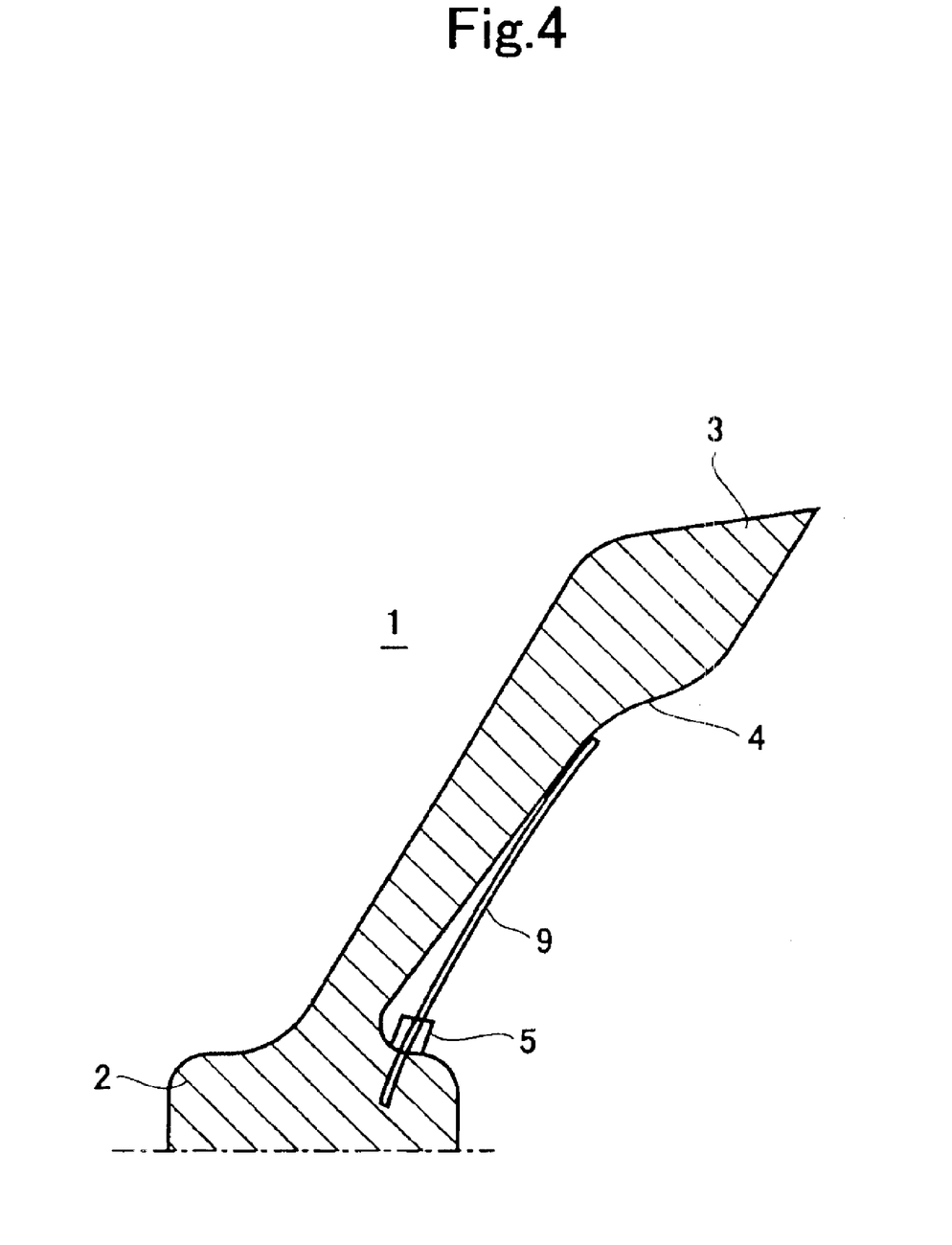
FIG. 4 is an explanatory view illustrating the structure of displacement detector means according to another embodiment of the present invention.

FIG. 4 is an explanatory view (a sectional view of the seal cup) illustrating the structure of displacement detector means according to an embodiment in which the strain gauge is attached at a different position. The seal cup 1 is provided radially with a number of resilient bars 9 extending from the boss 2 of the seal cup 1 to the reverse surface 4 near the periphery of the seal cup 1, with the strain gauge 5 affixed to the root of the resilient bar 9. The strain gauge 5 preferably detects with high sensitivity the extent of displacement due to bending of the resilient bar 9. Additionally, although the seal cup 1 would be badly contaminated after use, the strain gauge 5 may be located inside the seal cup 1 near the center thereof so as to be less contaminated, thereby facilitating its maintenance and inspection.

Figure 5:
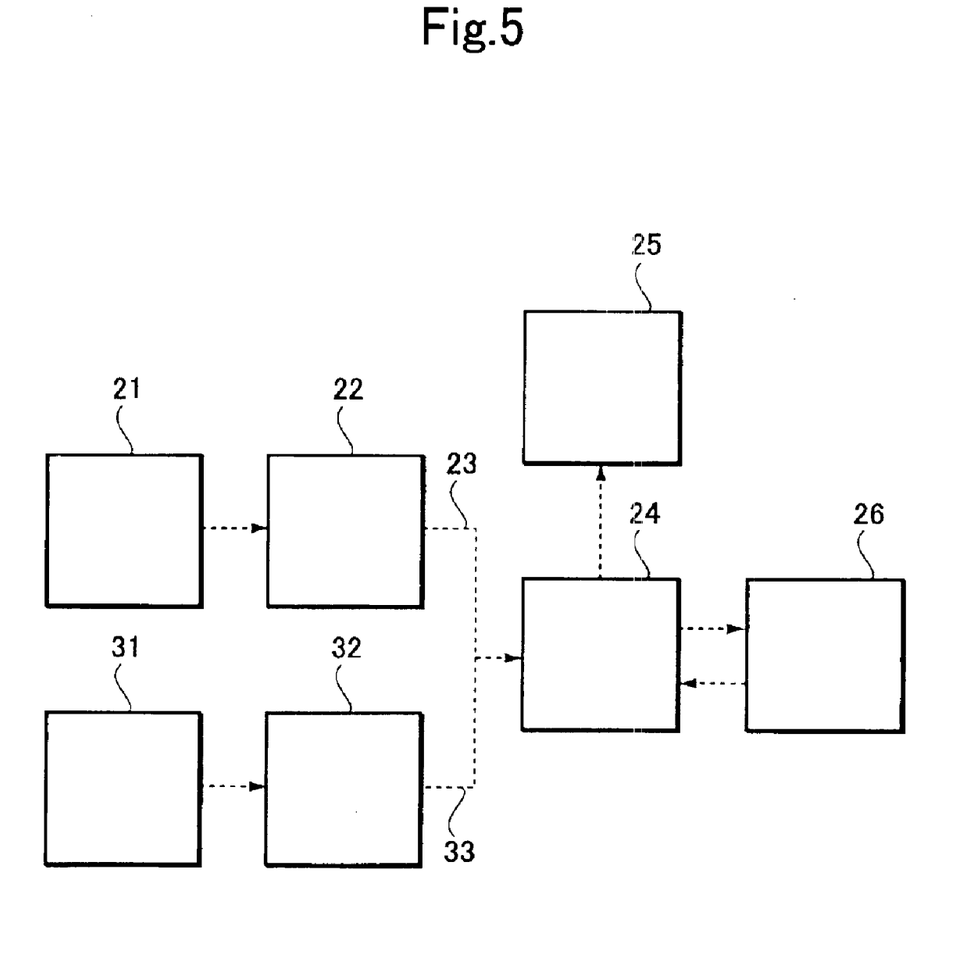
FIG. 5 is a block diagram illustrating the outline of the measuring apparatus according to the present invention.

FIG. 5 is a block diagram illustrating the outline of a measuring apparatus including such displacement detector means. A number of strain gauges 21 are each provided with a strain detector 22, which feeds its detection signal 23 to a computing device 24. The computing device 24 has stored therein the relationship between the strain gauge and the extent of deformation of the seal cup, and is adapted to process the detection signal 23 so as to compute the deformation of the seal cup. The result of the computation is delivered from an output device 25 and stored in a storage device 26 as well. On the other hand, a swing angle detector 32 measures the swing angle of a verticality indicator 31 such as a pendulum and feeds its output 33 to the computing device 24. It is possible to find the relationship of a deformation with the vertical direction by the output 33 being received and checked against and combined with the data computed with the signal from the strain detector 22.

Now, the embodiment of the present invention will be described in more detail.

Figure 6:
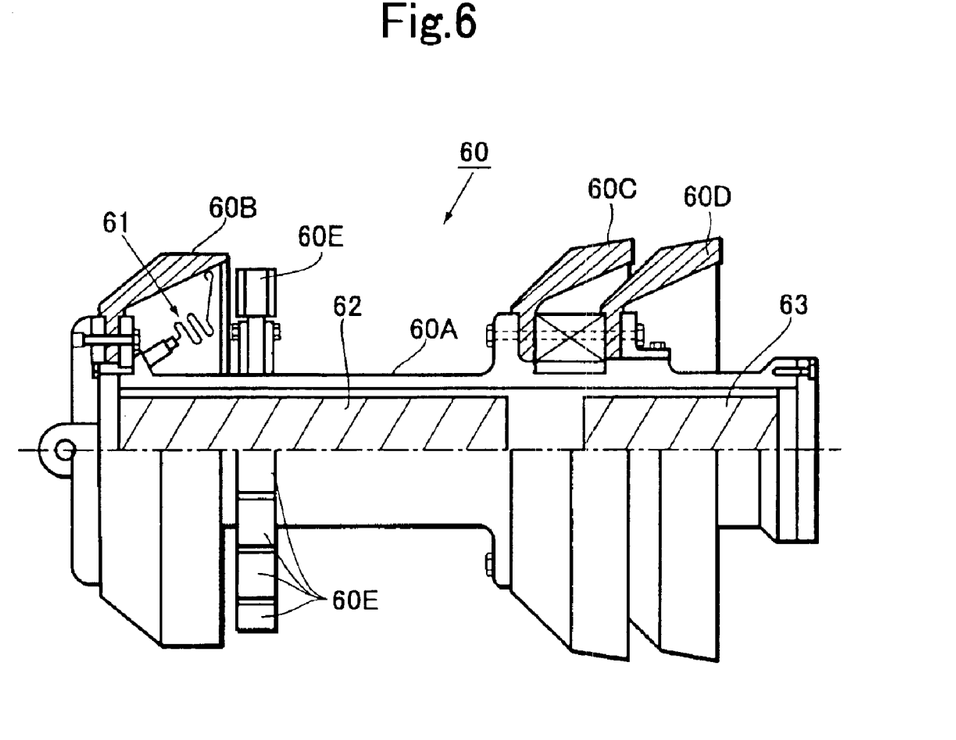
FIG. 6 is a partially sectional view illustrating the measuring apparatus according to the present invention which employs a cleaning pig for cleaning within a pipeline.

FIG. 6 is a partially cross-sectional view illustrating a measuring apparatus incorporating a cleaning pig to be used in cleaning the interior of a pipeline before a pipeline interior inspection pig is passed therethrough.

A cleaning pig 60 is provided, on a pig body 60A, with three serial seal cups 60B, 60C, and 60D which sealably slide along the interior of a pipeline, and provided, around the pig body 60A, with a plurality of magnets 60E for attracting foreign matters. Inside the forward-most seal cup 60B, there are disposed a number of displacement detection units 61 (e.g., twelve displacement detection units at angular intervals of 30 degrees with respect to the center) along the entire periphery of the seal cup to detect the radial displacement of the seal cup 60B, while in the rearward-most seal cup 60D there is provided an odometer system (not shown). Additionally, inside the pig body 60A, there are provided a measuring apparatus case 62 and a battery case 63.

Figure 7:
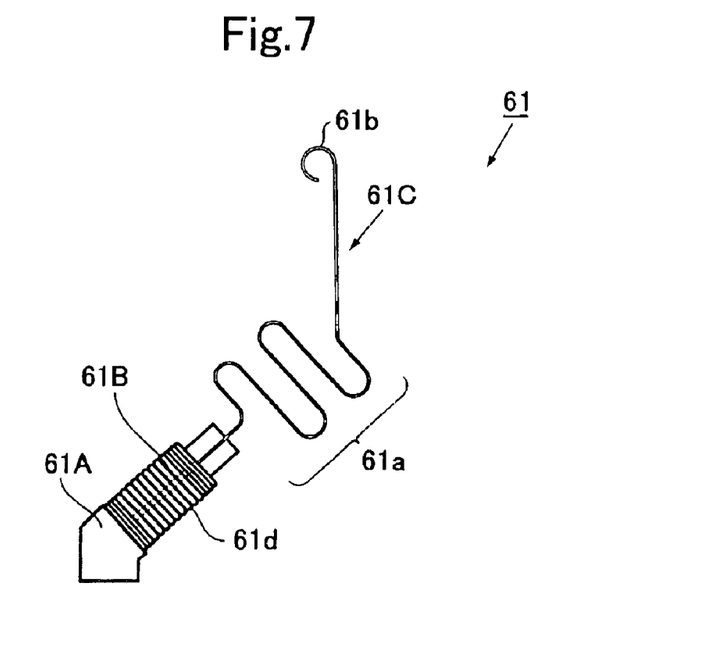
FIG. 7 is an explanatory view illustrating a displacement detection unit in the measuring apparatus of FIG. 6.

FIG. 7 is an explanatory view illustrating a specific configuration of the displacement detection unit 61. The displacement detection unit 61 has a strain gauge attachment portion 61B attached at its proximal end to a proximal portion 61A, while having a cantilever 61C (corresponding to the aforementioned resilient bar 9) attached to the distal end of the strain gauge attachment portion 61B. The strain gauge attachment portion 61B, covered with a bellows 61d, has a total of four strain gauges attached to the front and reverse surfaces of a steel plate (SUS) to form a bridge.

The cantilever 61C has a spring curve portion 61a and a contact portion 61b at its tip, which are all made of a phosphor bronze plate. The spring curve portion 61a is provided to extend the range of resilient deformation of the cantilever 61C, thereby making it possible to respond to a large displacement and provide improved durability.

Figure 8:
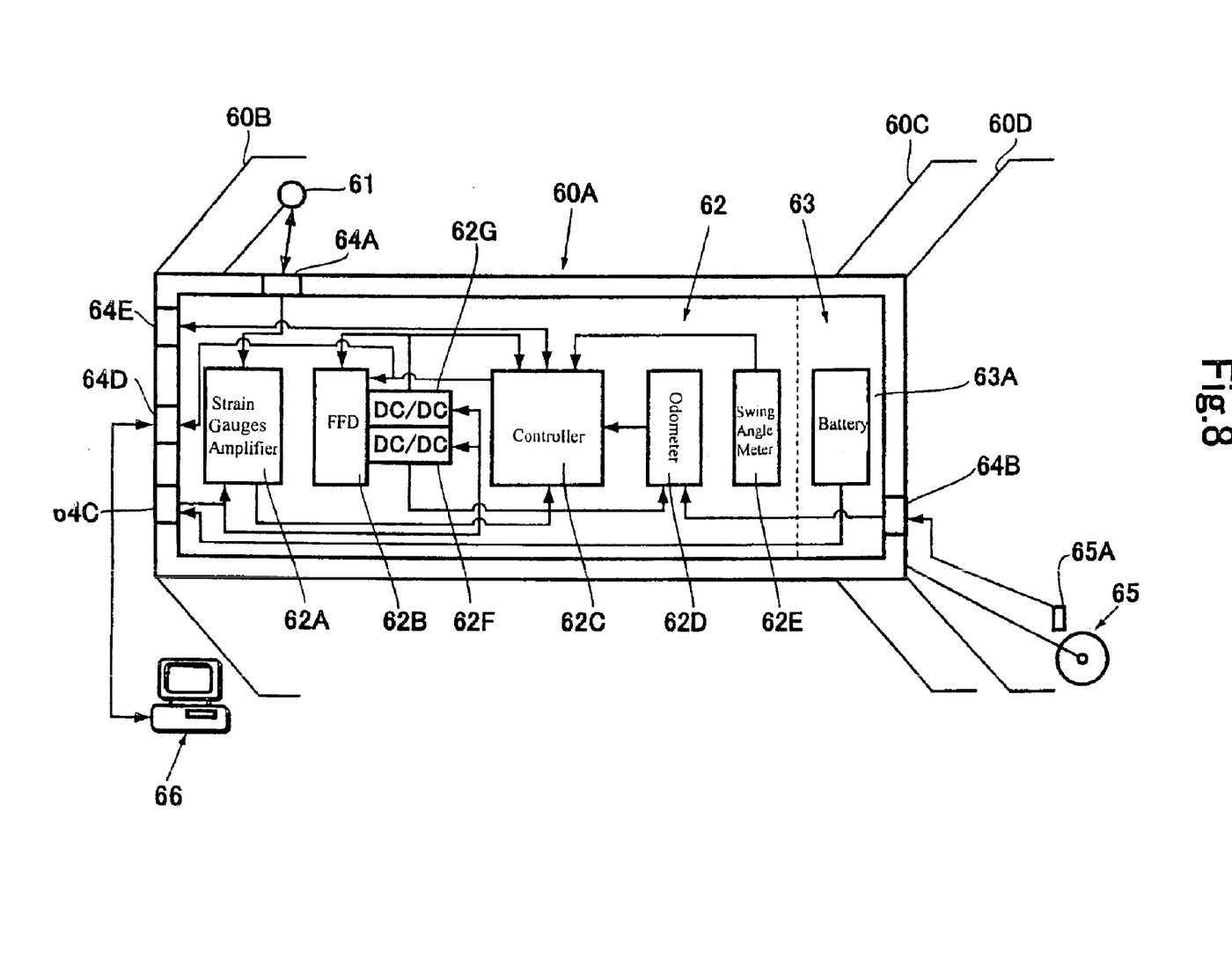
FIG. 8 is a system configuration diagram relating to the measuring apparatus of FIG. 6.

FIG. 8 is a block diagram illustrating the system configuration of the measuring apparatus shown in FIG. 6. Those components that have been described with reference to FIG. 6 are indicated by the same symbols and will not be mentioned all over again.

Inside the measuring apparatus case 62, there are provided a strain gauge amplifier 62A serving as a system component, an FFD 62B serving as recording means, a controller 62C serving as computing means, an odometer 62D, a swing angle meter 62E, and transformers 62F and 62G, while inside the battery case 63, there is provided a battery 63A.

A detection signal from the displacement detection unit 61 is delivered to the strain gauge amplifier 62A via a pressure-proof connector 64A (provided for the displacement detection unit), and then an amplified signal is delivered to the controller 62C. Additionally, a signal from the swing angle meter 62E is delivered to the controller 62C.

Furthermore, a detection signal from a detection portion 65A in an odometer system 65 is delivered via an odometer pressure-proof connector 64B to the odometer board 62D, the output therefrom being delivered to the controller 62C. The output from the controller 62C is recorded on the FFD 62B and as well delivered to an external data processing device 66 via a voltage-resistant data transfer connector 64D.

Furthermore, 64E also serves as a pressure-proof connector, connected to the controller 62C, for externally providing control of the controller.

As a power supply system, the battery 63A is connected to a voltage-resistant switch connector 64C, being further connected therefrom to the strain gauge amplifier 62A.

Furthermore, a voltage, which is coupled from the voltage-resistant switch connector 64C to the transformers 62F, 62G and transformed, is coupled to the FFD 62B, the controller 62C, and the odometer board 62D.

The controller 62C serving as computing means functions to interpret the location of the cleaning pig 60 (relative to the pipeline being measured) as two-dimensional position data containing the travel and swing positions, in accordance with the detected data from the odometer system 65 and the detected data from the swing angle meter 62E, and to deliver individually detected data from the displacement detection unit 61 corresponding to the position data.

A measuring method employing such measuring apparatus will be described below in accordance with the result of measurements provided by the aforementioned cleaning pig 60 having passed through the test pipe.

Figure 9:
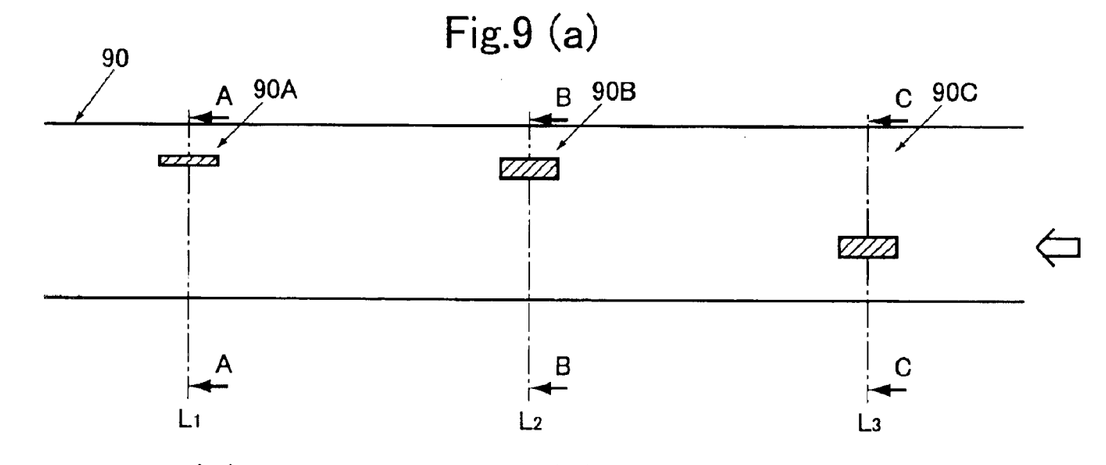
FIG. 9 is a view illustrating the design of a test pipe used to explain the measuring method according to the present invention.

FIG. 9 illustrates the state of a test pipe 90. FIG. 9(a) is a sectional side view, FIGS. 9(b), 9(c), and 9(d) being cross-sectional views taken along the line A—A, the line B—B, and the line C—C of FIG. 9(a), respectively. The test pipe 90 is provided with an event A (90A), an event B (90B), and an event C (90C) of protruded portions being formed on the interior surface at travel positions of travel distances L1, L2, and L3. In this arrangement, the event A and the event B are provided at the top in cross section of the pipe, while the event C is provided 90 degrees spaced apart therefrom. Additionally, the protrusion of the events B and C (30 mm in height) is greater in height than the event A (10 mm in height).

The aforementioned cleaning pig 60 is inserted through such a test pipe 90 in the direction of an arrow shown in the drawing, while the output from the controller 62C is analyzed after having been recorded on the FFD 62B.

Figure 10:
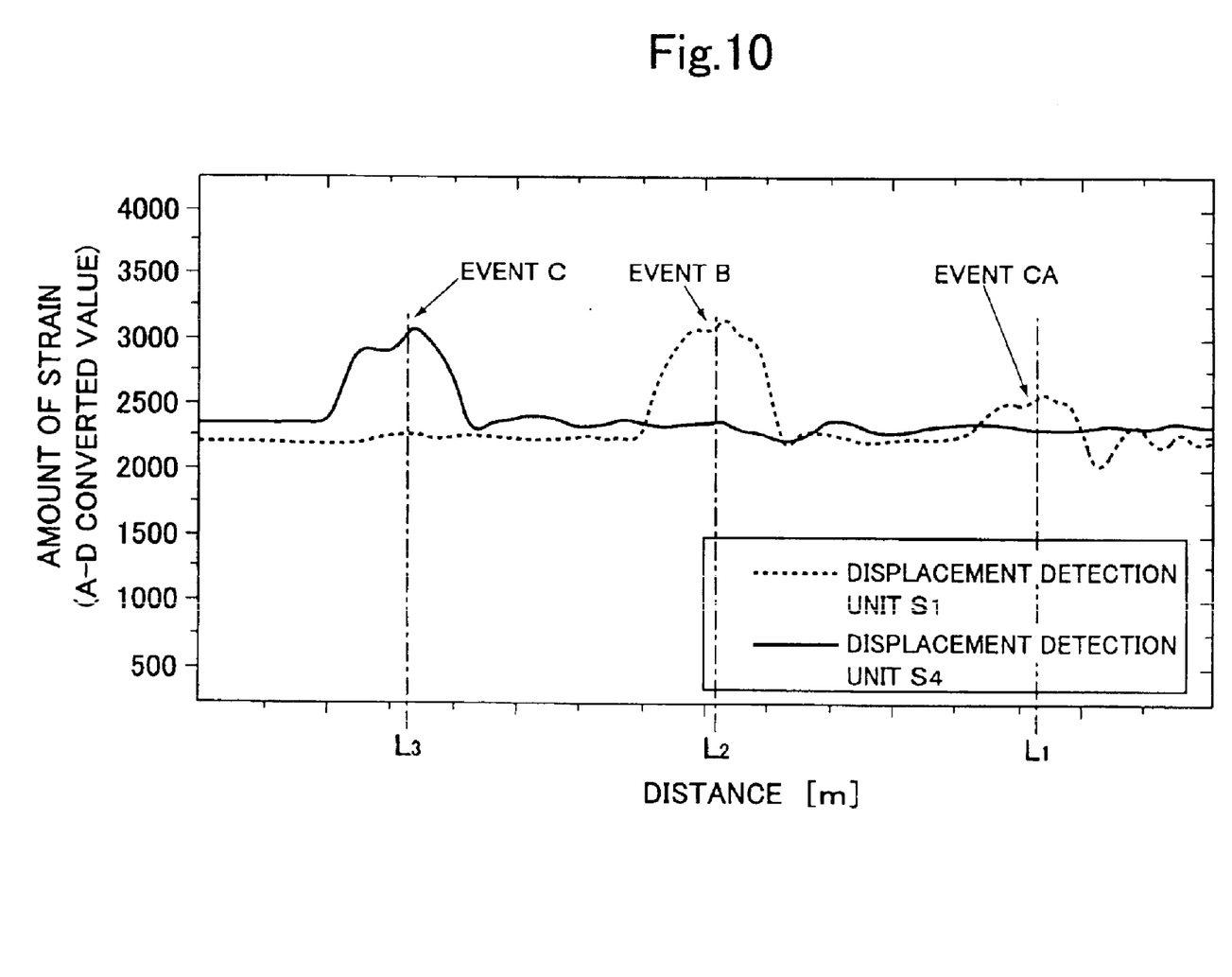
FIG. 10 is a graph showing the results of a test.

FIG. 10 is a graph showing the test results. Here, for an easy description, the graph only shows the result obtained under a condition not involving a variation in swing angle of the cleaning pig 60. Twelve displacement detection units S1 to S12 incorporated into the cleaning pig 60 provide twelve channels of outputs individually. However, the positional relationship between each of the displacement detection units S1 to S12 and the test pipe 90 would be as shown in FIGS. 9(b) to 9(d) in the absence of a variation in swing angle of the cleaning pig 60, with the outputs from the displacement detection units S1 and S4 responsive to each event being shown here in the graph.

As is clear from the graph, the output from the displacement detection unit S1 is indicative of strain detected in response to the events A and B at the travel positions L1 and L2, but no strain detected at the travel distance L3. Furthermore, the extent of strain detected is delivered in response to the height of the events. Additionally, the output from the displacement detection unit S4 is not indicative of strain detected at the travel distances L1 and L2, but a strain detected in response to the event C at the travel position L3. Here, for simplicity, an explanation is given for a case involving no variation in swing angle of the cleaning pig 60. However, it is also possible to detect a circumferential variation in the position of the displacement detection units S1 to S12 of twelve channels by including in the analysis the swing angle of the cleaning pig 60 detected by the swing angle meter 62E.

That is, according to the measurement of the inner diameter of a pipeline using a measuring apparatus incorporated into the cleaning pig 60 according to this embodiment, it is possible to accurately detect the position of a radial deformation in the pipeline on the two-dimensional coordinates of the travel position and the circumferential position as well as the extent of deformation based on the magnitude of a detection output.

The above description has been made on the cleaning pig as an example, however, a similar measuring apparatus can also be incorporated into a passage pig used to check for passableness before a pipeline interior inspection pig is inserted.

INDUSTRIAL APPLICABILITY

According to the present invention, it is possible to highly accurately measure the deformation of a seal cup running within a pipeline and distinguish a welding bead from other dents or rises, so as to make clear the circumferential position of the deformation (a relationship of the deformation with the vertical direction), and highly accurately detect the inner diameter of a pipeline even when a deformation is elliptical or shows other shapes.

Furthermore, since the deformation of the pipeline inner diameter can be detected in accordance with the travel position (axial position) and the circumferential position, it is possible to accurately detect the position of a partial deformation and accurately detect the orientation of an elliptical deformation or the like.

In this way, it is possible to highly accurately detect a deformation of a pipeline before a pipeline interior inspection pig is inserted and thus provide a method for measuring the inner diameter of a pipeline and a measuring system, which are very effective from the industrial point of view.

What is claim is:

1. A method for measuring an inner diameter of a pipeline, comprising:

detecting at least one of a radial and a tangential strain of a seal cup of an inner diameter caliper pig running within the pipeline to determine a deformation of a peripheral portion of the seal cup and thereby detect a variation in the inner diameter of the pipeline.

2. The method for measuring an inner diameter of a pipeline according to claim 1, wherein a travel position of said seal cup within the pipeline is also determined.

3. The method for measuring an inner diameter of a pipeline according to claim 2, wherein a circumferential swing angle of said seal cup is determined to detect a cross-sectional position of deformation of the pipeline relative to a vertical dimension of the pipeline.

4. The method for measuring an inner diameter of a pipeline according to claim 1, wherein a circumferential swing angle of said seal cup is determined to detect a cross-sectional position of deformation of the pipeline relative to a vertical dimension of the pipeline.

5. An apparatus for measuring an inner diameter of a pipeline comprising:

strain gauges disposed on a number of radii or concentric circles on an inner surface of a seal cup of an inner diameter caliper pig;

a strain detector for detecting and recording a deformation of individual strain gauges;

a travel distance recording device;

a swing angle detector provided on a pig body; and a computing device for computing a variation in pipeline inner diameter from a measurement value provided by said strain detector and said travel distance recording device and a measurement value provided by said swing angle detector.

6. The apparatus for measuring an inner diameter of a pipeline according to claim 5, wherein said strain gauge is affixed to a root portion of a resilient material disposed radially with a distal end thereof being in contact with the inner surface of said seal cup.

* * * * *

UNITED STATES PATENT AND TRADEMARK OFFICE
CERTIFICATE OF CORRECTION

PATENT NO. : 6,895,681 B2
DATED : May 24, 2005
INVENTOR(S) : Yasushi Yonemura et al.

It is certified that error appears in the above-identified patent and that said Letters Patent is hereby corrected as shown below:

Title page,
Item [54] Title, please correct to read as follows:
-- METHOD AND APPARATUS FOR MEASURING THE INNER DIAMETER OF PIPELINE --.

Signed and Sealed this

Twenty-third Day of August, 2005

JON W. DUDAS
*Director of the United States Patent and Trademark Office*